United States Patent Office 3,334,027
Patented Aug. 1, 1967

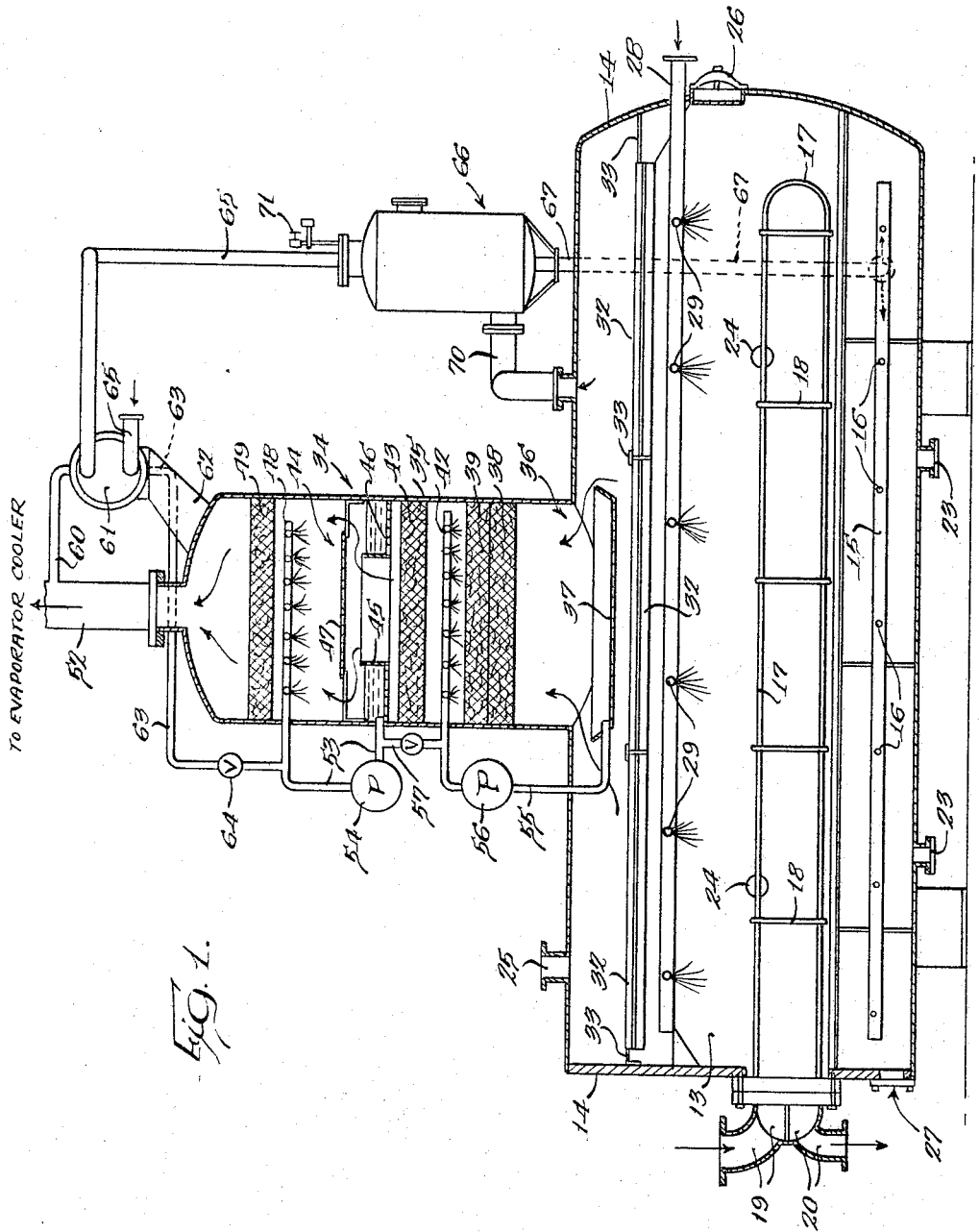

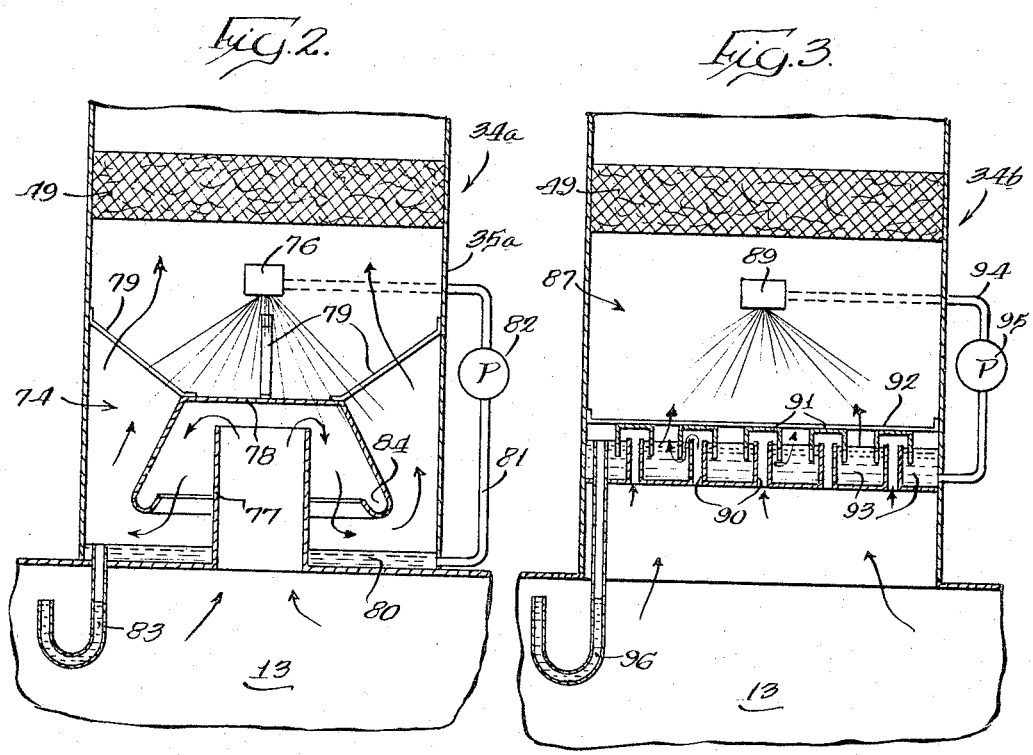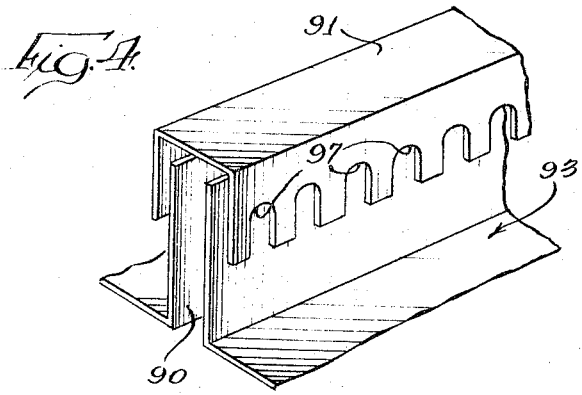

3,334,027
SEPARATION OF ENTRAINED LIQUID DROPLETS FROM VAPORS
Richard W. Goeldner, Brookfield, Wis., assignor to Aqua-Chem, Inc., a corporation of Wisconsin
Filed Dec. 26, 1963, Ser. No. 333,498
9 Claims. (Cl. 203—40)

This invention relates in general to the production of vapors having entrainment droplets of liquid removed therefrom to provide vapors which can be condensed as a purified liquid.

It is a general object of this invention to provide a new and useful apparatus and method for producing vapors of a liquid in the substantial absence of entrainment liquid droplets.

It is also an object of this invention to provide new and useful improvements in the separation of entrainment droplets from a vapor stream.

In one aspect of this invention, it is an object to provide a new and useful system wherein vapors are contacted with surface liquid maintained at approximately the same temperature as the vapors, for separation of entrainment droplets from the vapors.

In a more specific aspect, it is an object of this invention to provide an integrated combination of steps or elements in a method or apparatus useful in accordance with any of the above objects.

In another specific aspect, it is an object of this invention to provide a new and useful system including a wash stream of liquid at approximately the same temperature as the rising vapors for supplying a liquid surface at such temperature for contact with the vapors, in which the liquid stream is at least in part derived from treatment of the rising vapors and wherein the temperature of the liquid surface is maintained at least in part by the rising vapors.

Other objects of the invention will be apparent to those in the art from the following description and the drawings, in which;

FIGURE 1 is a vertical section through the walls of a form of apparatus suitable for use in accordance herewith showing the apparatus interior and including views of some of the elements of the apparatus or elements associated with the apparatus;

FIGURE 2 is a section through a portion of a modified form of apparatus illustrating differences from the apparatus of FIGURE 1;

FIGURE 3 is a section through a portion of another modified form of apparatus, showing the portions differing from the structure of FIGURE 1, and FIGURE 4 is a perspective view of a bubble cap arrangement used in the modification of FIGURE 3.

While this invention is susceptible of embodiment in many different forms, there is shown in the drawings and will herein be described in detail a specific embodiment of the invention with modifications thereof, with the understanding that the present disclosure is to be considered an exemplification of the principles of the invention and is not intended to limit the invention to the embodiment or modifications illustrated.

As an example of an apparatus of the present invention in which the method hereof may be carried out, reference is first made to FIGURE 1. In the embodiment illustrated, there is provided a vaporizing zone or chamber 13 defined by a shell 14 supported by suitable legs. Supported within shell 14 by suitable means is a feed water supply tube 15 having orifices 16 for supplying the feed water to vaporizing zone 13.

Also supported within chamber 14 is a heating element in the form of a plurality of U-bend tubes 17 supported by cross members 18. One end of each U-bend tube 17 is in communication through a tube sheet structure with a steam inlet and manifold 19 and the other end of each tube is in communication with a steam and/or condensate manifold and outlet 20. Water supplied to zone 13 via tube 15 and orifices 16 is held at a level in zone 13 at least substantially submerging tubes 17 and passage of steam through inlet 19, tubes 17 and outlet 20 results in heating of the water body within zone or chamber 13.

Shell 14 is provided with various openings including drain and bottom blow ports 23 and surface blow-down ports 24 which are normally capped during operation but may be uncapped for draining or blow-down of the evaporator system. The fitting 25 is provided for a relief valve or the like and a pressure release cap 26 is also provided for safety reasons. At reference numeral 27, there is shown a capped clean-out port and reference numeral 28 identifies a chill-shocking water inlet tube passing in through shell 14 and extending generally the length of chamber 13. Tube 28 includes spray ports 29 for inlet of cold water as a spray when needed or desired. The water level in chamber 13 is normally maintained between the top of tubes 17 and the chill-shocking water inlet tube 28.

Above tube 28 there is disposed a suppression baffle system 32 providing a tortuous passage for rising vapors from within chamber 13 for redistributing vapor flow and serving in some degree to return entrainment droplets to the body of water therebelow. The suppression baffles 32 include two laterally disposed series, one vertically spaced and staggered laterally with respect to the other. The baffles in the form shown are elongate inverted channels having their lengths running the length of chamber 13. Each channel of each series in the illustrated form is in three sections with the sections abutting end-to-end and supported by suitable mounting means 33 above the normal water level in zone 13.

Above the suppression baffles 32 is an entrainment separation zone 34 which is mostly included within a vertical cylindrical shell 35 in comunication with the interior of shell 14 at its lower or inlet end 36. Vapors rising through the baffle system 32 may enter inlet opening 36 around tray 37. Within shell 35 the vapors pass upwardly through a pair of demisters 38 and 39, e.g. of the wire mesh type. A water spray is directed from a spray system 42 downward through demisters 39 and 38 with water falling from demister 38 being collected in trough 37. The vapors rising below demister 38 rise in counter-current flow with the falling water and as the vapors pass through demisters 38 and 39, they are intimately contacted with water on the demister surfaces, supplied by spray system 42. The water of spray 42 and on the demister surfaces is maintained at a temperature approximately the same as that of the rising vapors in contact therewith.

The vapors leaving demister 39 rise through the spray from spray system 42 and thence pass through a third demister 43 wherein entrainment droplets are coalesced for return through demisters 39 and 38 to tray 37. The vapors are thereafter directed by a bubble cap arrangement indicated generally at 44 into contact with the surface of a body of water and then permitted to continue their rise. The bubble cap arrangement 44 includes a single bubble cap having a vapor riser 45, centrally in shell 35 and supported from shell 35 by an annular bottom plate to form an annular trough 46 defined by vapor riser 45, the inner wall of shell 35 and the annular plate. The bubble cap hood 47 is a circular plate for directing the riser vapors from vapor riser 45 outwardly, generally radially, into contact with an annular body of water contained within trough 46. The body of water is supplied by spray 48 through which the vapors pass, upon rising from the bubble cap 44. The vapors thereafter pass through a fourth demister 49 to an outlet conduit 52 for conducting the vapors to a suitable condenser (not shown) for condensation to form a purified water product.

The demisters 38 and 39 are washed demisters, washed by water from spray 42, and are used for entrainment separation while permitting the vapors to pass upwardly therethrough. The demister provides a large contact area between hot liquid surfaces and hot vapors at about the same temperature so that no appreciable condensation is effected. The vapors are not substantially cooled during their passage upward through zone 34. The wash water on the surfaces of demisters 38 and 39 provides a wet surface on the demister wires to improve collection of entrainment droplets. The water also serves to wash out or inhibit collection of any salts that might tend to encrust the demister; being hot, the water is more effective for such salt washing. Preferably, the wash water is sprayed in entrainment separation zone 34 by a spray system 42 from above the demister elements so that wash water droplets can collect entrainment droplets by contact and coalescence, e.g. above the washed demister elements.

The demister layer 43 is an unwashed demister layer which functions to remove wash water droplets which may be entrained in the vapors passing through the spray above the washed demisters 38 and 39. Likewise, demister layer 49 is unwashed for removal of wash water droplets which may be entrained from spray 48.

The wash water from spray 48 passes over bubble cap 44 and is collected within the bubble cap in trough 46 to provide the body of water therein, into surface contact with which the rising vapors are directed. Water from trough 46 is withdrawn through conduit 53 by pump 54 for supplying spray 48, providing recycle of the spray wash water back to the spray. Similarly, water collected by tray 37 is recycled through conduit 55 by pump 56 to spray 42. A valve conduit 57 interconnecting conduits 53 and 55 is provided for drainage of and make-up for trough 46 if this is desired, e.g. on shutdown or for removal of concentrated recycle wash liquid.

As the vapors leave through outlet conduit 52, the major portion of the vapors is conducted to a condenser for recovery of product distilled liquid. A small portion of the vapors passes through line 60 to a heat exchanger in the form of a reflux condenser 61 mounted by a bracket 62 to the top of shell 35. The vapors are condensed in condenser 61 and returned by reflux return line 63 through a one-way check valve 64 to conduit 53 for supplying excess hot condensate to the cyclic system including spray 48 and trough 46. Displaced fluid from the cyclic system overflows from trough 46, causing similar overflow from tray 37 back to zone 13.

In addition to the return of hot condensate through line 63 from the reflux condenser 61, other provisions are made for maintaining the elevated temperature of the wash liquid in demisters 38 and 39 and trough 46 for surface contact with rising vapors. For example, the tray 37 and trough 46 include large heating surfaces disposed for heat exchange with hot rising vapors for heating the liquid in the tray and trough. Also, the vapors rising through zone 34 pass in countercurrent flow with the water in the wash system heating the water by heat exchange therewith. Also, the collection and recycle of the wash water serves to maintain water temperature in the demister and in the sprays.

Returning to reflux condenser 61, the vapors from line 60 are condensed by heat exchange with cooled feed water charged through line 65 through the reflux condenser 61 and thence to a feed deaeration and heating system 66. The reflux condenser 61 serves to partially preheat the feed. In the deaerator and heater 66, the feed water is passed in countercurrent flow with a minor stream of vapor rising through vapor line 70 which is passed through the feed water in zone 66, and thence through line 67, to water inlet tube 15. Any necessary venting is accomplished by vent 71.

Turning now to FIGURES 2 and 3, there are illustrated modified entrainment separation zones 34a and 34b which may be used in lieu of the zone 34 disclosed hereinabove with reference to FIGURE 1. It is to be understood in considering each of the systems that the equipment shown in shell 35a or 35b replaces the equipment in shell 35 of FIGURE 1.

In the system of FIGURE 2, the entrainment separation is accomplished by means of a single bubble cap 74 and the unwashed demister layer 49. A spray 76 is directed over the bubble cap. Vapors from the supression baffle 32 are passed through vapor riser 77 of bubble cap 74 and are redirected downwardly and outwardly by hood 78 of the bubble cap. Hood 78 is suspended in zone 34a by brackets 79. Vapor riser 77 forms the inlet to the entrainment separation system 34a. The redirected vapors pass into surface contact with a body of water in annular trough 80 and thence pass upward through the spray from spray system 76 and through unwashed demister 49 to outlet 52. Spray 76 is supplied with water from trough 80 through conduit 81 by means of pump 82. The water level in trough 80 is maintained by a liquid trap 83 which returns any excess or overflow water to zone 13 without permitting the passage of vapors from zone 13 into zone 34 other than by way of vapor riser 77.

It will be noted that hood 78 includes a lower edge on the skirt portion thereof forming a generally annular trough 84. There may be provided a partial water curtain or falls from the lip of trough 84 through which vapors, passing downwardly and outwardly from vapor riser 77, will pass. Such water curtain as well as the spray from the system 76 can provide additional coalescence of water droplets.

Turning now to the system of FIGURE 3, there is provided a bubble cap system shown generally at 87 disposed beneath the uppermost layer of unwashed demister 49. Bubble cap system 87 is supplied with water from a spray system 89. Vapor entering inlet 36 from zone 13 is directed through a bubble cap system, to rise through a plurality of elongate slot vapor risers 90 in the upward travel of the vapor. Each elongate vapor riser 90 is provided with a cooperating elongate hood in the form of an inverted channel 91. Hoods 91 are in parallel disposition over the parallel vapor risers 90 and secured in positon by suitable mounting members 92 secured in turn to shell 35. Defined laterally and on either side of each vapor riser and hood combination is an elongate trough 93 adapted to retain a body of water. Thus, the bubble cap system in the form shown comprises a plurality of elongate generally parallel bubble caps.

Spray system 89 is supplied from troughs 93, which are interconnected by suitable conduits (not shown), through conduit 94 by the force of pump 95. A liquid trap 96 is also provided for maintaining the level of water in the interconnected troughs 93 below the top edge of the parallel walls defining the vapor risers 90. As vapors rise through the vapor risers 90, they are directed outwardly and downwardly by hoods 91 into the body of water in troughs 93 beneath the surface thereof for bubbling through the body of water. For this purpose, an array of slots 97 (FIGURE 4) is provided extending upwardly from the lower edge of each leg of each channel-shaped hood 91. Slots 97 function as vapor distribution outlets from hood 91 along the length thereof at various spaced points or positions. The slots 97 are disposed entirely below the water level in troughs 93 sufficient to cause bubbling of vapors therefrom through the liquid in troughs 93 for passage thence upward through the spray from spray system 89. The rising vapors thereafter pass through unwashed demister 49 to vapor outlet 52.

The temperature of the recycled or cyclic wash streams in FIGURES 2 and 3 is maintained at its elevated level, e.g. at approximately the temperature of the rising vapors, by heat exchange with the rising vapors while in trough 80 or 93 respectively or while being sprayed from spray system 76 or 89. Also, entrained liquid, added to the stream in trough 80 or 93 or the spray space above, assists in maintaining the temperature. As entrained liquid is added to the cyclic wash stream, overflow is returned through trap 83 or 96 to the evaporator chamber 13 to maintain the cyclic wash stream at approximately constant volume.

I claim:

1. A system for evaporating feed liquid and forming a liquid vapor supply in the absence of liquid droplets, the liquid vapor supply being condensible to purified liquid, which system comprises an evaporator for producing vapor from said feed liquid having a feed liquid inlet and a vapor outlet, means defining an upward vapor flow path from said outlet, at least three demister means disposed at separate levels across said flow path for removing entrainment droplets of liquid from vapor rising therethrough, separate means intermediate the second and third of said levels for directing wash liquid on the demister means of the level therebelow at approximately the same temperature as the rising vapor, and means below the lowest demister level for collecting wash liquid from the lowest demister, the demister means of the highest level across said path being maintained unwashed by said directing means.

2. Apparatus for producing continuous water vapor supply condensible to purified water, which comprises a feed preheating zone, a deaerating zone, a vaporizing zone, means for charging impure feed water through said preheating zone and deaerating zone to said vaporizing zone, means for heating water in said vaporizing zone to vaporization temperature, means suppressing vapors rising in the vaporizing zone adapted to permit a portion of the vapors to rise therethrough, means directing a minor portion of the vapors rising through the suppression means to the deaerating zone for deaeration of feed, means directing a major proportion of the vapors rising through a flow path, first, second and third demister means in said flow path spaced along said path from each other, means maintaining the demister surface of said first demister means wet with water at approximately the same temperature as the rising vapors, bubble cap means in said flow path between said second and third demister means for diverting the rising vapor into contact with a body of water, water spray means directed on said bubble cap between said bubble cap and third demister means, means for recovering the major portion of rising vapors from said third demister means as water vapors in the substantial absence of entrained water droplets, conduit means directing a minor portion of vapor from the third demister means to said feed preheating zone in heat exchange with feed passing therethrough whereby the feed is preheated and the vapors are condensed, conduit means for returning the condensed vapors from the preheat zone as reflux to said water spray means, means for collecting water as said body of water from said water spray means, means for recycling collected water from said body of water to said water spray means, means for collecting water from said first demister means, and means for recycling water collected from said first demister means to said maintaining means.

3. A system for evaporating feed liquid and forming a liquid vapor supply in the absence of liquid droplets, the liquid vapor supply being condensible to purified liquid, which system comprises an evaporator for producing vapor from said feed liquid having a feed liquid inlet and a vapor outlet, means defining an upward vapor flow path from said outlet, wire mesh demister means disposed across said flow path for removing entrainment droplets of liquid from rising vapor, collecting means disposed beneath said demister means in the flow path of said rising vapors for catching the falling removed entrainment droplets of liquid, and means directing a separate stream of said liquid from said collecting means as wash liquid on said demister means at approximately the same temperature as the rising vapor, thereby providing a wet surface on the demister means for collection of entrainment droplets without appreciable vapor condensation while washing salts from said demister means normally tending to encrust said demister means, said collecting means collecting said wash liquid with said falling entrainment droplets for recycling as wash liquid to said directing means, and said collecting means being adapted to discharge a portion of the collected fluid to said evaporator.

4. Apparatus for separating entrainment droplets of water from a rising stream of water vapor comprising flow path means confining said stream for flow in an upward direction, bubble cap means including means for containing a body of water, said bubble cap means being disposed across said flow path for directing the rising stream into contact with the body of water, spray means above said bubble cap for maintaining a spray in said flow path above said bubble cap means and for supplying water to said body, whereby the rising vapors from said bubble cap means pass through said spray, means for recycling the water from the means for containing said body of water to said spray means for maintaining said spray and bubble cap means at approximately the same temperature as the rising vapors, and wire mesh demister means above said spray for separating any remaining entrainment droplets.

5. The apparatus of claim 4 wherein said bubble cap means is adapted to direct said rising vapor into said body of water below the surface thereof.

6. The apparatus of claim 4 wherein said bubble cap means is adapted to direct said rising vapor along the surface of the body of water.

7. Apparatus for producing a continuous water vapor supply condensible to purified water, which apparatus comprises a feed preheating zone, a deaerating zone, a vaporizing zone, means for charging impure feed water through said preheating zone and said deaerating zone to said vaporizing zone, means for heating the water in said vaporizing zone to vaporization temperature, collecting means for maintaining a body of water above said vaporization zone at approximately the temperature of vapor rising from said vaporizing zone, a first wire mesh demister means positioned above said collecting means, spray means disposed above said demister means, means directing the vapors rising from said vaporizing zone around the collecting means up through the demister means and through a water spray from said spray means, said water spray wetting said first demister means and supplying water to said body of water in said collecting means, means controlling said body of water at a predetermined water level, means for recirculating the water in said collecting means to said spray means, a second unwashed wire mesh demister means above said spray means through which said vapors must pass for further separation of entrainment droplets therefrom, and means for recovering the vapors passed from said second demister means as a product condensible to purified water.

8. The system as claimed in claim 1 wherein a portion of the vapor from the third demister means is directed through a heat exchange means for condensing said vapors, said condensed vapors being recirculated as reflux to said wash liquid.

9. A method for forming a continuous water vapor supply substantially devoid of water droplets and condensible to purified water, which method comprises charging impure feed water through a preheating zone and a deaerating zone to a vaporizing zone, heating the water in said vaporizing zone to vaporization temperature, directing a minor portion of the vapors rising from the vaporizing zone to the deaerating zone for deaeration of the feed passing therethrough, directing a major proportion of the vapors rising from the vaporizing zone through a first demister zone and into contact with the demister surface while wetting the demister surface with water at approximately the same temperature as the rising vapors, whereby entrained water droplets are coalesced and removed from the rising vapors, thereafter directing the rising vapors through a second demister zone for further separation of entrained droplets, diverting the water vapor in a bubble cap zone into contact with a body of water while maintaining the body of water at approximately the temperature of the rising vapors, passing the rising vapors from the bubble cap zone through a water spray directed on said bubble cap zone and thence through a third demister zone for further separation of entrained water droplets, recovering a major portion of the rising vapors from the third demister zone as water vapors in the substantial absence of entrained water droplets, directing a minor portion of vapor from the third demister zone to said feed preheat zone in heat exchange with feed passing therethrough whereby the feed is preheated and the vapors are condensed, returning the condensed vapors from the preheat zone as reflux to said spraying step, collecting water from said spraying step for maintaining said body of water, collecting water from said first demister zone, recycling water collected from said first demister zone to the wetted surface of said first demister zone and recycling water from said body of water to said spraying step.

References Cited

UNITED STATES PATENTS

| | | | |
|---|---|---|---|
| 1,407,380 | 2/1922 | Chenard | 202—197 X |
| 1,986,165 | 1/1935 | Sieck | 202—198 X |
| 2,224,984 | 12/1940 | Potts et al. | 202—197 X |
| 2,368,669 | 2/1945 | Lee et al. | 203—1 |
| 2,578,925 | 12/1951 | Davis | 202—197 X |
| 2,885,328 | 5/1959 | Williamson | 203—10 X |
| 2,956,934 | 10/1960 | Waddill | 202—197 X |
| 2,994,647 | 8/1961 | Williamson et al. | 203—11 X |
| 3,074,216 | 1/1963 | Loebel | 55—185 |

FOREIGN PATENTS 229,889    10/1963    Austria.

NORMAN YUDKOFF, *Primary Examiner.*

F. E. DRUMMOND, *Assistant Examiner.*